March 31, 1953  G. L. DIMMICK ET AL  2,633,427
METHOD FOR PRODUCING A LIGHT SLIT
Filed April 22, 1947
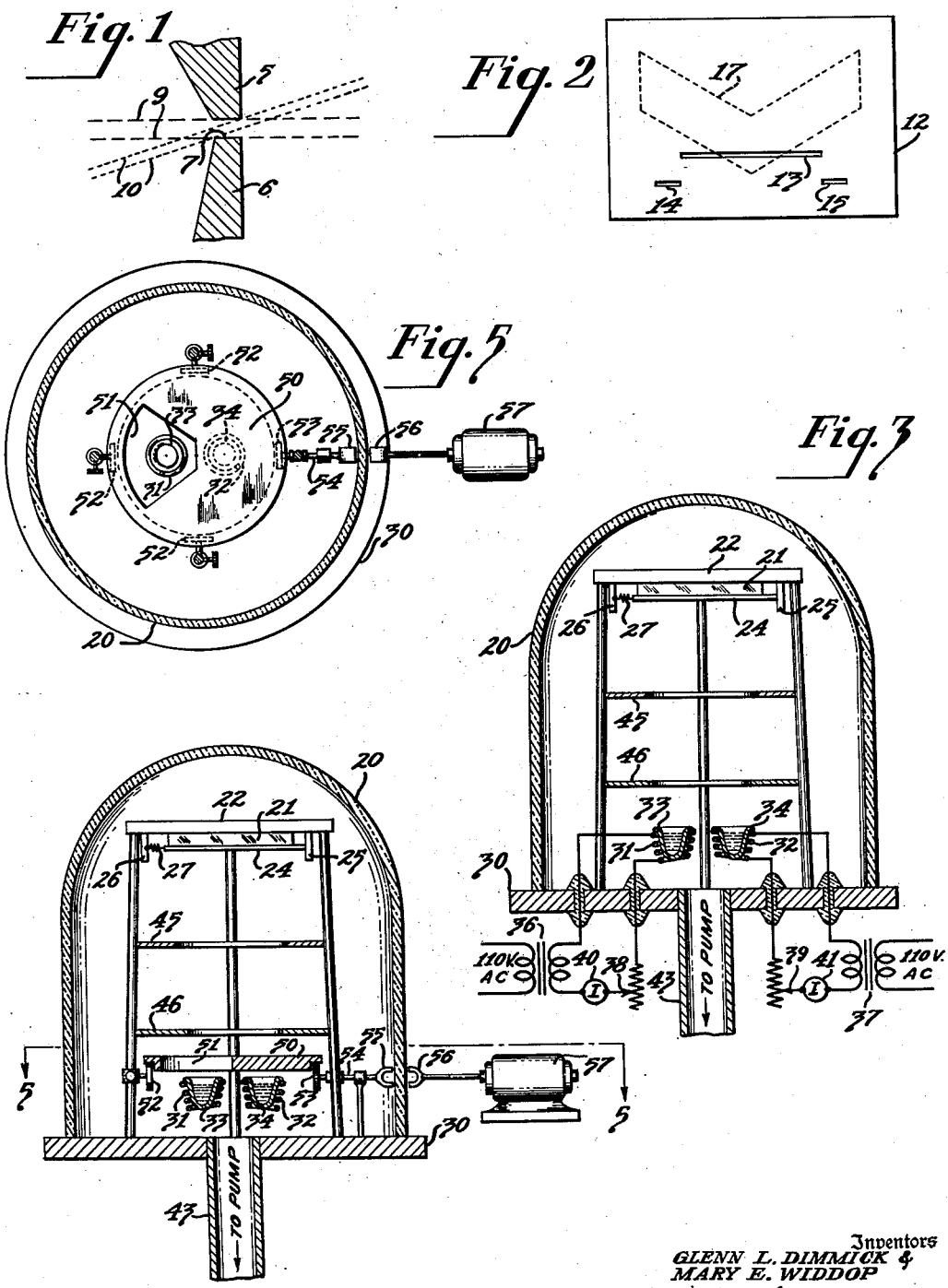
Inventors
GLENN L. DIMMICK &
MARY E. WIDDOP
By
Attorney

UNITED STATES PATENT OFFICE 2,633,427

METHOD FOR PRODUCING A LIGHT SLIT

Glenn L. Dimmick and Mary E. Widdop, Haddon Heights, N. J., assignors to Radio Corporation of America, a corporation of Delaware Application April 22, 1947, Serial No. 743,222

9 Claims. (Cl. 117—38)

This invention relates to a method for producing a light defining optical element and particularly to a light slit for use in sound recording or reproducing systems.

In the recording and reproducing of sound from photographic records thereof, a light beam is defined or shaped usually by two elements, one being an aperture having various predetermined shapes depending on the type of sound record to be recorded, and the other element being a narrow slit which defines the width of the light beam passing to the film. Inasmuch as the definition of the edges of the light beam reaching the film is one of the factors determining the quality of the sound record, it is particularly important that the light defining slit have the proper qualities to provide good definition. Two of these qualities are that the slit must be thin to provide an equal width light beam regardless of the angle of incidence of the light on the slit, and the edges of the slit be straight and uniform and easy to keep clean.

Mechanical slits have been used but these have been found to be expensive and difficult to make because of the extreme accuracy and the large amount of hand work and testing required to produce them. Even when produced with the greatest care they still have many objectionable characteristics such as the difficulty in keeping them clean without injury when thin enough to provide a constant width beam, the difficulty in making two slits exactly alike, the difficulty in keeping the surface of the slit edges parallel, and the difficulty in keeping them smooth and free from irregularities. Where the slits are more complicated, that is, the slit plate or mask has more than one slit therein, it is realized that mechanical slits are extremely difficult and expensive to produce.

Other methods have been tried for producing light slits on the order of the .0018 of an inch in width such as by photo-etching thin metal sheets. These have not proved satisfactory, for high quality sound recording purposes. Also attempts have been made to produce light slits by coating one surface of a circular plate of plain glass with chemically deposited silver, the slit then being made by scraping the silver off of the glass in a narrow rectangular area. A cover glass was then cemented over the silvered surface. When a sharp tool was used, the above slits were satisfactory except that the silver reflected so much light that "ghost" images were produced by the light reflecting back and forth between the glass surfaces and the silver surface. This prevented the use of such chemically deposited slits. When a black coating of Bakelite paint was applied to the glass to prevent reflection, the paint being scraped off with a sharp tool, the slits were still unsatisfactory because the paint had considerable thickness and the edges tore when the tool passed through it. Thus, the slit edges were not sharply defined and because of the thickness of the paint, the groove would collect dirt and was difficult to keep clean.

The present invention is directed to a method of producing a very black light absorbing film on a predetermined portion of a transparent plate, the film being relatively hard, relatively insoluble in water, insensitive to temperature, and unaffected by age. In general these films, with a narrow light transmitting slit therein, are obtained by stretching a fine steel wire across and in contact with the under surface of the glass plate mounted in a bell jar. The black film is then evaporated on the under side of the glass making all of the glass opaque except the area directly beneath the stretched wire. Since wire drawn through diamond dies is extremely uniform in diameter, the slit thus formed is extremely accurate in size and all slits are practically identical. Also, the thickness of the evaporated material is only that of a few wave lengths of light, eliminating thickness effects, and there are no "ghost" images because the black coating absorbs most of the light striking it. A cover glass is cemented over this slit and the two outer glass surfaces of the combined unit are coated to reduce reflection. Such a unit is very easy to clean simply by wiping the outer glass surfaces with a cloth.

The principal object of the invention, therefore, is to provide an improved method of manufacturing light slits or apertures.

A further object of the invention is to provide an improved method of manufacturing a large number of identical size small width light slits with opaque portions having high light absorbing qualities.

A still further object of the invention is to provide an improved method of producing small light defining openings having sharply defined edges and which are rugged and easy to maintain.

A still further object of the invention is to provide an improved method of manufacturing light apertures by evaporating opaque material on a predetermined portion of a light transmitting element.

Although the novel features which are believed to be characteristic of this invention will be pointed out with particularity in the appended claims, the manner of its organization and the mode of its operation will be better understood by referring to the following description read in conjunction with the accompanying drawings forming a part hereof, in which:

Fig. 1 is a fragmentary view in cross-section of a prior type of mechanical light slit;

Fig. 2 is a front view of a modern type of light slit mask which may be made by the invention;

Fig. 3 is a cross-sectional view of a system for manufacturing the light slit embodying the invention; and Fig. 4 is a cross-sectional view of the modification of the system of Fig. 3.

Fig. 5 is a transverse cross-sectional view taken along the line 5—5 of Fig. 4.

Referring now to the drawings, jaws 5 and 6 are those of a mechanical light slit of the type mentioned above, it being observed that due to the width of the jaws the light beam being transmitted perpendicular to slit 7, such as shown by limiting rays 9, is wider than a beam of light at an angle to the light slit, such as shown by limiting rays 10. Since, for purposes of cleaning, the slit jaws 5 and 6 must have appreciable thickness to prevent damage thereto, they have the disadvantage of providing a slit which varies in effective width according to the angle of incident light rays thereon.

In Fig. 2, a modern type of slit mask 12 is shown with a long slit 13 therein and two shorter slits 14 and 15 displaced therefrom and on which has been superimposed a light beam image shown by the dotted lines 17 to illustrate one method of sound recording. That is, the beam of light 17 is vibrated vertically by a light modulator, the slit 13 passing different lengths of the light beam dependent upon the position of the beam image 17 on the mask.

As mentioned above the slit is formed by evaporating material onto the surface of a glass plate across which is placed a very uniform and fine steel wire, the material being deposited over the glass surface except where prevented by the wire. When the wire is removed, a light transmitting aperture having sharp parallel edges is provided in the material on the glass.

Referring now to Figs. 3 and 4, which illustrate suitable film depositing apparatus, the deposition is accomplished by the use of a bell jar 29 in which is mounted a piece of glass 21 against a metal plate 22. A fine steel wire 24 has one end mounted at 25 and the other end mounted at 26, a spring 27 being employed to maintain the wire straight and in firm contact with the glass plate 21. The bell jar 20 is mounted on a base 30 through which pass electrical conductors to heating coils 31 and 32 of molybdenum wire, which heat molybdenum boats 33 and 34, respectively, the wire being cemented to, but insulated from, the boats with aluminum oxide cement.

The external circuits for the boats are through respective transformers 36 and 37 having variable resistors 38 and 39 and ammeters 40 and 41, respectively. The transformers 36 and 37 are connected to any standard 60 cycle 110 volt source. The bell jar 20 is evacuated by connection to a vacuum pump through a pipe 43. Since the vacuum is not perfect, about .2 of a micron being used in practice, there is a small percentage of the evaporated molecules which strike the air molecules and get deflected so that some of the material could be deposited on the glass within the area defined by the wire. However, by use of a pair of baffles 45 and 46 having openings of restricted size and graduated in both length and width therein, this diffusion is prevented by permitting only the directly transmitted evaporated particles to reach the glass and thus a slit of the width defined by the diameter of the wire results.

In determining the type of material and the method of using the above described apparatus many pure metals were used, such as copper, silver, aluminum, gold, lead, cadmium and zinc. It was found that these metals all reflected too much light. Also, an attempt was made to find an inorganic compound which would evaporate easily, be black and light absorbing, have a high transmission density in layers a few wave lengths thick, and be relatively hard and insoluble in water. No such material was found. Carbon was discarded because the carbon evaporates very slowly and the resulting film is quite soft.

Since no single material appeared satisfactory, the use of a combination of materials was conceived, such as a material of low electrical resistance and a material of high electrical resistance; i. e., a metal and an insulator, in the correct proportion, and it was discovered that a combination of copper and manganese fluoride in substantially equal proportions provided the best result. The optical properties of metals are directly related to their electrical properties. This is shown by the equation:

$$R = 1 - 0.365\sqrt{\frac{r}{\lambda}}$$

Where R is the reflectivity of the metal, $r$ is the specific resistance of the metal in ohms and $\lambda$ is the wave length of radiant energy in microns. This equation is very accurate for wave lengths over 12 microns while the following equation holds for wave lengths between 5 microns and 12 microns:

$$R = 1 - \left(0.365\sqrt{\frac{r}{\lambda}} - 0.0667\frac{r}{\lambda}\right)$$

These equations show that the reflectivity decreases as the resistivity increases, that is, when the metallic reflectivity decreases to zero the resistivity is infinite. Now, when a metal and insulator are simultaneously evaporated, the molecules of metals in the resulting film are separated by the molecules of the insulator material. This lowers the conductivity to nearly zero and reflectivity is correspondingly reduced.

Also, it was discovered that the proportion of the copper and the manganese fluoride should be evaporated in approximately equal proportions, although the proportions were not particularly critical. If the proportion of insulator is too great the opacity of the resulting film is not as great as is desirable, while if the proportion of metal is too great, the film will be partially conducting and, therefore, would reflect a portion of the light.

Thus, in Fig. 3, one of the boats contained copper and the other manganese fluoride and these were simultaneously evaporated and deposited on the glass plate 21. In carrying out this process, it was discovered that even though the glass were cleaned with great care, pin holes would appear in the opaque portion of the slit which were caused by small particles adhering to the glass after it had been cleaned, thus preventing the evaporated material from reaching the glass. When these particles were removed by cleaning a clear area would result. This difficulty was overcome by a double evaporation technic as follows:

First, a fairly dense film of copper and manganese fluoride was evaporated and then the bell jar was opened. The surface of the film was then brushed with a soft brush to remove the particles to new locations. The jar was then evacuated again and another film layer of copper and manganese fluoride was deposited over the first. This method completely eliminated the pin holes.

To produce a film which was black on both surfaces by reflection, it was found unnecessary to keep both the metal and the insulator evaporating continuously. That is, in the first step both the metal and the insulator were evaporated simultaneously at about the same rate for a few minutes. The second step was to turn off the insulator boat and leave the metal evaporating. Now, when the film was opaque the last step was to turn on the insulator boat and have the two boats operate simultaneously for a few minutes. This procedure resulted in a film having a pure metal core with surface layers made up of a combination of metal and insulator, the surfaces thereof being black. This procedure took less pure metal to obtain the necessary opacity than if the combination of metal and insulator were used for the complete film.

Furthermore, the double evaporating technic to eliminate pin holes could be used to advantage in this later method. For instance, the two boats are used for the first few minutes and then the boat containing the insulator is turned off, the boat containing the metal is then continued until the film is nearly opaque. The bell jar is then opened and the film surface is brushed, this outer surface being a bright copper color at this stage. The jar is then again evacuated and the metal boat is turned on, and after the desired opacity has been obtained the boat containing the insulator is turned on and the simultaneous evaporation is continued for a few minutes until the outer surface is as black as desired. To illustrate the relative thickness of each of the four layers of the superposed coatings it was found that the following time schedule gave satisfactory results:

1st composite coating (simultaneous evaporation of metal and insulator)—3 minutes,
1st coating of metal alone—7 minutes,
2d coating of metal alone—7 minutes,
2d composite coating (simultaneous evaporation of metal and insulator—3 minutes.

Since the composite coatings were formed by simultaneous evaporation of two substances at about equal rates and since voltage and current were maintained constant for all coatings, it can be seen that the thicknesses of each of the four coatings was about the same. Since the actual voltage and current used would depend upon many variable factors such as construction of the heating units, size of the apparatus, length of evaporation path, etc., the listing of the actual figures would be of little significance. By visual observation of opacity and color by reflected light the operator can easily determine when enough material has been deposited.

Another modification of the above described evaporating technic may also be used with apparatus such as illustrated in Figs. 4 and 5. In the first and last steps of the evaporating procedure, instead of evaporating the metal and insulator simultaneously, they may be evaporated alternately and deposited as a plurality of extremely thin layers each of the order of a single molecule in thickness. Referring to Figs. 4 and 5, a rotatable shutter 50 is conveniently positioned above the mouths of crucibles 33 and 34. This shutter may be a masking plate having an open segment 51 which may be about one-fourth the entire area of the shutter 50. The shutter is supported on idler rollers 52 and is driven by means of a driving roller 53 connected through a drive-shaft 54 to a magnet 55. A similar magnet 56 is placed outside the vacuum chamber 20 with its poles adjacent the poles of magnet 55. The magnet 56 is connected to the rotor shaft of a variable speed motor 57 which may have appropriate reduction gearing. Rotation of the rotor shaft of motor 57 at a slow rate of speed rotates its associated magnet 56 and also causes corresponding rotation of the magnet 55 within the vacuum chamber. Rotation of the magnet 55 on its shaft results in the rotation of the shutter 50.

When the open segment 51 of shutter 50 is positioned over one of the crucibles 33 or 34, the evaporating material from that crucible passes through to strike the plate 21 while that from the other crucible is prevented from depositing thereon. The shutter is rotated slowly, allowing evaporated material from, first, one crucible and then the other to be deposited but not material from both simultaneously. The shutter is preferably rotated at a speed such that each crucible is unmasked for only a few seconds at a time, say 2 to 4 seconds, since that is sufficient time to deposit a monomolecular layer at conveniently low voltages. For each particular material, voltage, distance, etc., the preferred time may be easily estimated. Instead of using a motor to rotate the shaft to which magnet 56 is attached, it may, of course, be rotated by hand.

Using the alternating method the same effect is obtained as when evaporating both materials simultaneously. The remainder of the process including the intermediate steps of evaporating a single or double layer of metal, alone, and the brushing of the coating to eliminate pinholes is similar to that previously described in connection with simultaneous evaporation and the relative evaporation times given in the previous example may be used. It may be noted that the thickness of each of the intermediate layers of copper, when such are used, is of the order of 100 times as thick as that of any of the extremely thin monomolecular layers deposited in the alternating method and the factor is, of course, 200 if a double layer of copper is deposited before depositing the final light-absorbing coatings. These figures are given only as approximations, however, and considerable variation is possible without departing from the spirit of the invention.

After the evaporated slits are completed by either method as just described, they are baked at 100° C. for several hours to stabilize the film. A thin cover glass is then cemented over the film to protect it against deep scratches or abrasions, using either Canada balsam or a thermosetting cement. After the slit is thus completed it may be spun into a metal mounting for use in a sound recording or reproducing optical system.

It is to be noted that certain other combinations may be used to produce evaporated slits such as silver, gold, copper, aluminum and lead in combinations with zinc sulphide, manganese fluoride, thorium oxi-fluoride and magnesium fluoride. As mentioned above, however, the preferred combination is copper and manganese fluoride. The films made with copper and magnesium fluoride are very black but were affected by moisture and temperature. Copper and zinc produced fairly durable films but they were not sufficiently black. Copper and thorium oxifluoride made a hard black film but when heated, the metal and the insulator appeared to separate and the film became highly reflective. It was found that silver would not evaporate properly since it diffused all through the bell jar. Gold was found to be satisfactory but not economical by comparison. Lead was found to be too soft, while it was necessary to evaporate aluminum from a tungsten coil which made control of the rate of evaporation very difficult.

We claim as our invention:

1. The method of producing a light transmitting aperture comprising evaporating a metal of low electrical resistance and an insulating material of high electrical resistance in a vacuum, directing said evaporated materials to the surface of a transparent medium, covering said medium with a narrow uniformly parallel sided shield, depositing said evaporated material over said medium and said shield, said depositing being extended over two predetermined time periods and the evaporation of said materials being simultaneous, and removing said shield to form said aperture.

2. The method in accordance with claim 1 in which said materials are evaporated simultaneously for the first time period in substantially equal proportions, evaporating only said metal for a second predetermined time period and simultaneously evaporating said metal and said insulator for a third predetermined time period in substantially equal amounts.

3. The method in accordance with claim 2 in which said deposited surface is brushed during an interval in the depositing period of said metal.

4. The method in accordance with claim 3 in which said metal is copper and said insulator is manganese fluoride, said method including baking said deposited materials for several hours at substantially 100° C.

5. The method of producing a light aperture comprising alternately evaporating a metal of low electrical resistance to increase light absorption and an insulator of high electrical resistance to decrease light reflections onto a surface of a transparent body to form an opaque coating of superimposed successive layers of each of said materials, masking a predetermined area of said surface by a mask in contact with said surface whereby deposition of said materials on said area is prevented, and removing said mask to form a light transmitting area with low light reflecting and high light absorbing areas surrounding said light transmitting area, the depositing of said materials being done alternately in periods of from two to four seconds each to form sufficient layers to provide an opaque coating.

6. The method of producing a high light absorbing and low light reflecting surface on a transparent plate across which a wire shield has been stretched, comprising alternately evaporating a plurality of very thin layers of a metal and an insulator onto a surface, said metal increasing light absorption, and said insulator decreasing light reflection, evaporating an intermediate layer of said metal of substantially greater thickness than any of said very thin layers to provide opaqueness of said surface, and resuming the alternate evaporation of said very thin layers of said metal and of said insulator until another plurality of layers have been deposited, and brushing said deposited materials during the discontinuance of said depositing to eliminate pin holes therein, said deposited materials being baked for several hours at approximately 100° C.

7. The method of forming a high light absorbing and low light reflecting surface, comprising simultaneously evaporating metal having a low electrical resistance for increasing light absorption and an insulator having a high electrical resistance for decreasing light reflection for approximately three minutes on a surface, coating a surface with said evaporated metal and insulator, evaporating said metal alone for approximately seven minutes, and depositing on said surface, brushing said material, again coating said surface with said metal for approximately seven minutes, and depositing on said surface, and simultaneously evaporating and coating said surface with said metal and insulator for approximately three minutes.

8. The method in accordance with claim 7, in which said metal is copper and said insulator is manganese fluoride.

9. The method in accordance with claim 8, in which said coating is baked for several hours at approximately 100° C.

GLENN L. DIMMICK.
MARY E. WIDDOP.

REFERENCES CITED

The following references are of record in the file of this patent:

UNITED STATES PATENTS

| Number | Name | Date |
|---|---|---|
| 1,010,866 | Coolidge | Dec. 5, 1911 |
| 1,605,526 | Case | Feb. 12, 1925 |
| 2,151,457 | Williams | Mar. 21, 1939 |
| 2,153,363 | Bruche | Apr. 4, 1939 |
| 2,160,714 | Biggs | May 30, 1939 |
| 2,394,930 | McRae | Feb. 12, 1946 |
| 2,408,529 | Osterberg | Oct. 1, 1946 |
| 2,399,860 | Dimmick | May 7, 1947 |
| 2,427,592 | Dimmick | Sept. 16, 1947 |
| 2,433,635 | Sukumlyn | Dec. 30, 1947 |